United States Patent
Ito et al.

[11] Patent Number: 5,225,955
[45] Date of Patent: Jul. 6, 1993

[54] DISK-SHAPED MAGNETIC RECORDING MEDIUM HAVING NOVEL TEXTURED SURFACE

[75] Inventors: Motoyuki Ito; Kazuo Noda; Tadashi Shinohara, all of Kumagaya, Japan

[73] Assignee: Hitachi Metals, Ltd., Tokyo, Japan

[21] Appl. No.: 684,956

[22] PCT Filed: Oct. 11, 1990

[86] PCT No.: PCT/JP90/01308
§ 371 Date: Jun. 20, 1991
§ 102(e) Date: Jun. 20, 1991

[30] Foreign Application Priority Data
Oct. 11, 1989 [JP] Japan ................. 1-264207

[51] Int. Cl.$^5$ ............................ G11B 5/82
[52] U.S. Cl. ................................ 360/135
[58] Field of Search ........................ 360/135

[56] References Cited
U.S. PATENT DOCUMENTS
5,070,425 12/1991 Inumochi .................. 360/135

FOREIGN PATENT DOCUMENTS
62-146434 6/1987 Japan.
62-154322 7/1987 Japan.
62-192918 8/1987 Japan.

Primary Examiner—Robert S. Tupper
Attorney, Agent, or Firm—Wenderoth, Lind & Ponack

[57] ABSTRACT

A novel magnetic recording medium has a texture consisting of a multiplicity of circumferential stripes which intersect the circumferential direction at an angle of 0.1°–20°. The friction coefficient on the surface of the medium is low and varies little among manufactured products. The medium is thus easy to start even though the surface is contacted by a magnetic head.

1 Claim, 2 Drawing Sheets

DISK-SHAPED MAGNETIC RECORDING MEDIUM HAVING NOVEL TEXTURED SURFACE

TECHNICAL FIELD

The present invention relates to a magnetic recording medium which permits information to be written to or read from it by the use of a magnetic head, for example, and more particularly to a magnetic recording medium having either microscopic grooves called texture on its surface or an uneven surface.

BACKGROUND ART

Heretofore, magnetic disk drives have been employed so that information can be written to or read from magnetic recording media. For this purpose, the space between a magnetic head and a magnetic recording medium is usually maintained at a very small value, say between 0.2 and 0.3 μm. If the head makes frictional contact or collides with the recording medium, they will be worn down or get damaged. To avoid this undesirable phenomenon, a floating head slider carrying a magnetic head is used. In particular, because of a speed difference between the slider and the surface of the recording medium a hydrodynamic floating force is produced in the gap between them to maintain the minute space between them.

However, when the magnetic recording medium is stopped, the aforementioned hydrodynamic floating force is not produced and, therefore, the slider is in contact with the medium and locked. Since the surfaces of the slider and of the medium are fabricated quite accurately, the slider may be attracted to the medium when they are at rest or stopped as described above. If the slider is attracted to the medium in this way, a rather large torque is needed to start or stop the medium. Consequently, it may become impossible to start the medium, or the head makes a frictional contact with the medium, damaging the contact surfaces. As a result, they can no longer be used. In this way, various problems are caused.

The means normally adopted to solve the above-described problems is to form microscopic grooves called a texture on the surface of the magnetic recording medium or to make the surface of the medium uneven. If the slider is brought to a stop on the medium, the slider is prevented from being attracted to the medium although the smooth surfaces actually come in contact with each other.

A known method of forming the texture described above is to etch pits or holes in random directions. A more common method consists in rotating a substrate for a magnetic recording medium and pressing an abrasive tape against the surface of the substrate by a pair of pressure rolls made from a resilient material such as rubber. Another common method is to press a disklike abrasive rotary member against the surface of the substrate. The obtained texture assumes either of two patterns. In one pattern, grooves are concentric about the center of rotation of the substrate. In another pattern, grooves intersect the circumferential direction of the substrate at an angle θ that is not constant. These two patterns are illustrated in FIGS. 5 (a) and (b), respectively. In FIG. 5(a), the grooves 1 in the texture are concentric. In FIG. 5(b), the grooves 1 in the texture cross the circumferential direction at angle θ.

The prior art pattern of the texture on the substrate has been studied very little. The principle of the prior art method relies only on formation of grooves or on making the surface uneven. Therefore, if a desired texture is actually formed on the surface of the substrate, the intended decrease in the friction coefficient between the surface of the substrate and the magnetic head is not expected when they are used in practice. Consequently, the contact start and stop (CSS) characteristics and other characteristics of the magnetic recording medium are poor. In some methods, the roughness of the texture is limited within a certain range, but the angle θ at which each groove in the texture intersects the circumferential direction is by no means taken into account. This angle is hereinafter referred to as the intersection angle. For this reason, the CSS characteristics such as the friction coefficient on the surface vary greatly among fabricated magnetic recording media. Hence, the recording media have neither sufficient durability nor sufficient reliability.

In recent years, magnetic recording media have been required to have higher recording density and larger capacity. Therefore, it is necessary to greatly enhance the accuracy with which the substrate is machined. In addition, it is necessary that the pattern of the texture be made as optimal as possible to improve the CSS characteristics.

The present invention is intended to solve the foregoing problems with the prior art techniques. It is an object of the invention to provide a magnetic recording medium having a substrate on which a texture is created in a given pattern, thereby exhibiting reliable and excellent CSS characteristics.

DISCLOSURE OF THE INVENTION

The above object is achieved in accordance with the teachings of the invention by a magnetic recording medium comprising a substrate made from a nonmagnetic material, an underlying layer formed on the surface of the substrate and made from a nonmagnetic material, a magnetic film made from a magnetic material and formed on the underlying layer, and a texture formed on the surface either of the substrate or of the underlying layer and consisting of stripes intersecting the circumferential direction of the substrate at angles preferably of 0.1° to 20°.

If the intersection angles of the stripes of the texture of this magnetic recording medium are less than 0.1°, then the texture differs little from the prior art texture consisting of coaxial grooves and does not contribute to improvements in the CSS characteristics. Therefore, this structure is not desired. If the intersection angles are in excess of 20°, then it is cumbersome to adjust the intersection angles during a machining process. Furthermore, in the case of a thin disk, the direction of magnetization does not agree with the axis of easy magnetization. Hence, the best use may not be made of the characteristics of the magnetic material. Therefore, this structure is unwanted.

In the present invention, the intersection angle can be continuously and linearly varied from the radially inner part of the magnetic recording medium toward the outside. As an example, the angle is set between 1.3° to 1.4° on the inner part and set between 0.5° to 0.6° on the outer part. It is also possible to make the intersection angle substantially uniform over the whole surface of the magnetic recording medium.

The novel texture can be machined by any of various methods. One method utilizes an abrasive tape. Another method uses a rotary grinding stone. The method employing an abrasive tape yields desirable results. In particular, this method consists in rotating the substrate, pressing the abrasive tape against the surface of the substrate by pressure rolls, and moving the tape radially or diametrically of the substrate. In this case, the intersection angle can be adjusted or controlled by adequately controlling either the rotational speed of the substrate or the moving speed of the abrasive tape.

BEST MODE FOR CARRYING OUT THE INVENTION

EXAMPLE 1

A substrate having an outside diameter of 95 mm, an inside diameter of 25 mm, and a thickness of 1.27 mm was fabricated from aluminum having a high purity of 99.99%. This substrate was electrolized in an acid bath containing chromatic acid, and an underlying layer of alumite was formed on both surfaces of the substrate up to a thickness of 10 $\mu$m. The surface of the underlying layer was then ground until the underlying layer had a thickness of about 2 $\mu$m and the surface was then finished to a roughness Ra=40 Å.

Figure 1:
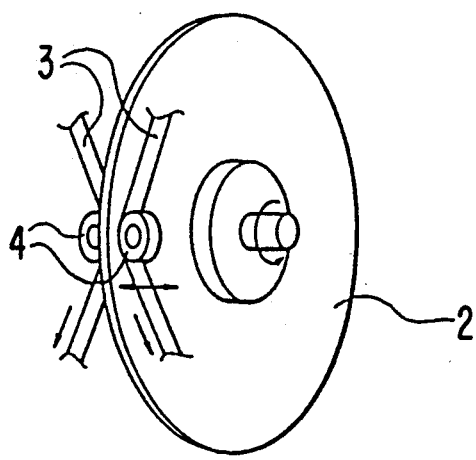
FIG. 1 is a perspective view of main portions of a texture-machining means for fabricating a magnetic recording medium according to the invention.

A texture was then created on the surface of the underlying layers. A machining means as shown in FIG. 1 was used for this purpose. In FIG. 1, the substrate, indicated by numeral 2, was rotated at 300 rpm. A texture tape 3 having an outside diameter of 12 mm and a roughness WA #2500 was moved at a speed of 5 mm/sec longitudinally past each underlying layer. Rotatable pressure rolls 4 each having an outside diameter of 30 mm, an axial length of 10 mm, and a hardness Hs=60 were pressed against the sides of the traveling tape 3 facing away from the underlying layer at a pressure of 0.3 kg/cm$^2$. The rolls were reciprocated once diametrically of the substrate 2 at a speed of 450 mm/min. The intersection angle $\theta$ of the texture fabricated in this way was between 1.3° and 1.4° on the underlying layer on the radially inner part of the substrate 2 and between 0.5° and 0.6° on the underlying layer on the radially outer part. The angle changed continuously linearly from the inner part toward the outer part.

A magnetic film of Co-Cr-Ta alloy containing 12.5 atomic % of chromium, 3 atomic % of tantalum and cobalt, and a protective film of carbon were successively sputtered on the substrate 2 having the texture described above up to thicknesses of 600 Å and 300 Å, respectively. As a comparative example, a texture consisting of substantially concentric stripes was formed in the underlying layer on the above-described substrate with the intersection angle $\theta \approx 0°$. Then, a magnetic film and a protective film of carbon were formed thereon in the same way as described above.

Figure 2:
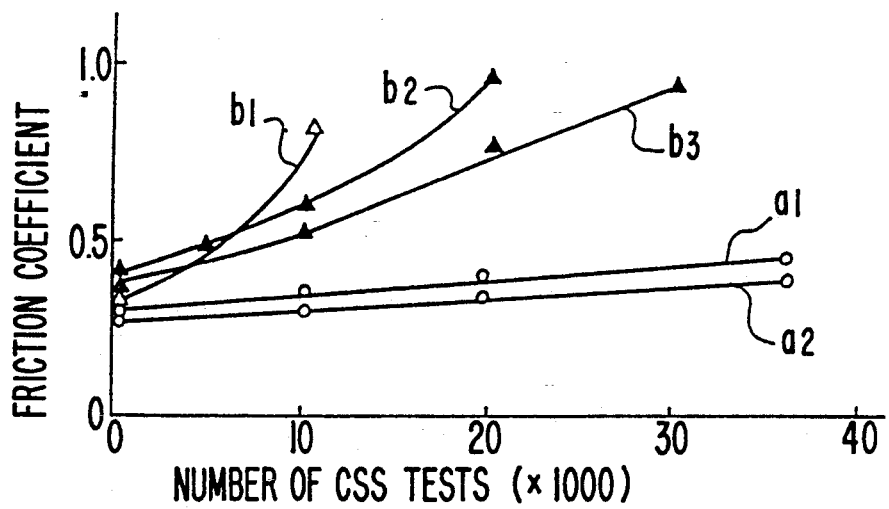
FIGS. 2 and 3 are graphs showing the relation of the friction coefficient to the number of tests made of CSS characteristics.

FIG. 2 is a graph showing the relation of the friction coefficient to the number of tests made of the CCS characteristics. Curves $a_1$ and $a_2$ are for the medium according to the invention in which the intersection angle $\theta$ was 1.3° to 1.4° on the inner part of the substrate and 0.5° to 0.6° on the outer part. Curves $b_1$, $b_2$, $b_3$ are for the comparative examples, and in which the intersection angle of the stripes of the texture $\theta \approx 0°$. A magnetic head of Mn-Zn monolithic type having a track width of 20 $\mu$m was used for the tests of the CSS characteristics. The width of the slider was 610 $\mu$m. The pressure of the gimbal spring was 9.5 gf. The medium floated 0.2 $\mu$m above the substrate on a circumference having a radius of 24 mm. The maximum rotational speed of the substrate was 3600 rpm. The test of the CSS characteristics was repeated at intervals of 30 seconds. The measurements were made under these conditions.

As can be seen from FIG. 2, for the medium indicated by curve $b_1$ with $\theta \approx 0°$, the friction coefficient increased drastically when the number of tests of the CSS characteristics reached about 10,000, thereby deteriorating the CSS characteristics. For the media indicated by curves $b_2$ and $b_3$ and having intersection angles $\theta$ approximating the angle for curve $b_2$, the numbers of tests of the CSS characteristics increased compared with the case of curve $b_1$. However, the number of tests of the CSS characteristics that gave a friction coefficient of 0.7 differed greatly between $b_2$ and $b_3$. In this way, the value differed very greatly among the comparative examples. This proves that the quality was not stable. In contrast, for curves $a_1$ and $a_2$ indicating examples of the invention, the friction coefficients were both low. In addition, the friction coefficients increased at low rates with an increasing number of tests of the CSS characteristics. Also, the friction coefficient varied little between the two examples. Hence, the CSS characteristics were stable. This demonstrates that the examples of the invention had improved quality.

EXAMPLE 2

This example is similar to Example 2 except that the texture tape 3 was reciprocated two or three times to increase the density of the grooves in the texture. The density of the grooves in the texture, i.e., the number of the stripes left on the surface of the substrate per unit area by a grinding operation for creating the texture, increased by a factor of two or three compared with the density obtained in Example 1. However, the results of tests made of CSS characteristics were similar to the results derived in Example 1. It was confirmed that the friction coefficient was small and that the variations among the substrates were very small.

EXAMPLE 3

Figure 3:
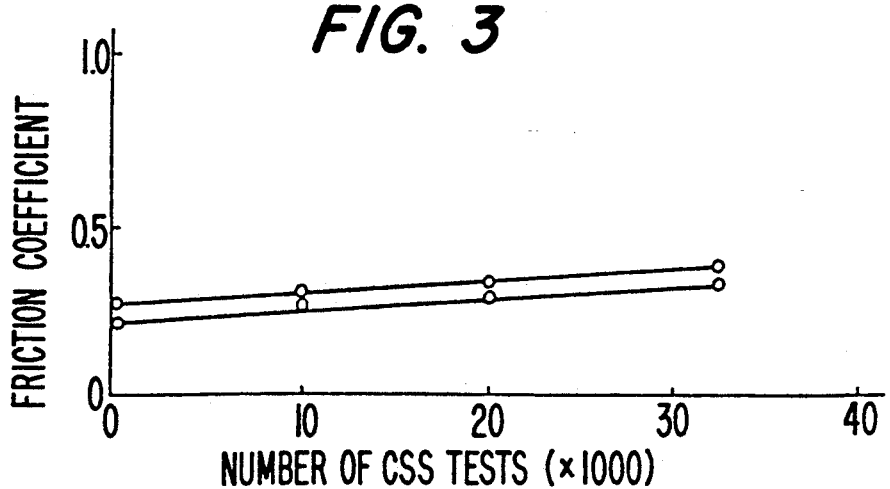

The texture-machining by the means shown in FIG. 1 was used. The rotational speed of the substrate 2 was so controlled that the peripheral speed of the substrate 2 at the position at which it was in contact with the texture tape 3 was kept constant. This peripheral speed was controlled within the range from 1074 to 1432 mm/sec. A texture consisting of stripes with intersection angles $\theta = 0.6°$ to 0.8° was formed uniformly over the whole surface of the substrate 2. FIG. 3 is a graph showing the results of tests performed of the CSS characteristics of such substrate 2 fabricated into recording medium as described above. As can be seen from this graph, the friction coefficient an increased at a lower rate with increasing number of tests of CSS characteristics compared with the friction coefficient shown in FIG. 2. It was also noticed that the variations among the substrates were reduced further.

EXAMPLE 4

Figure 4:
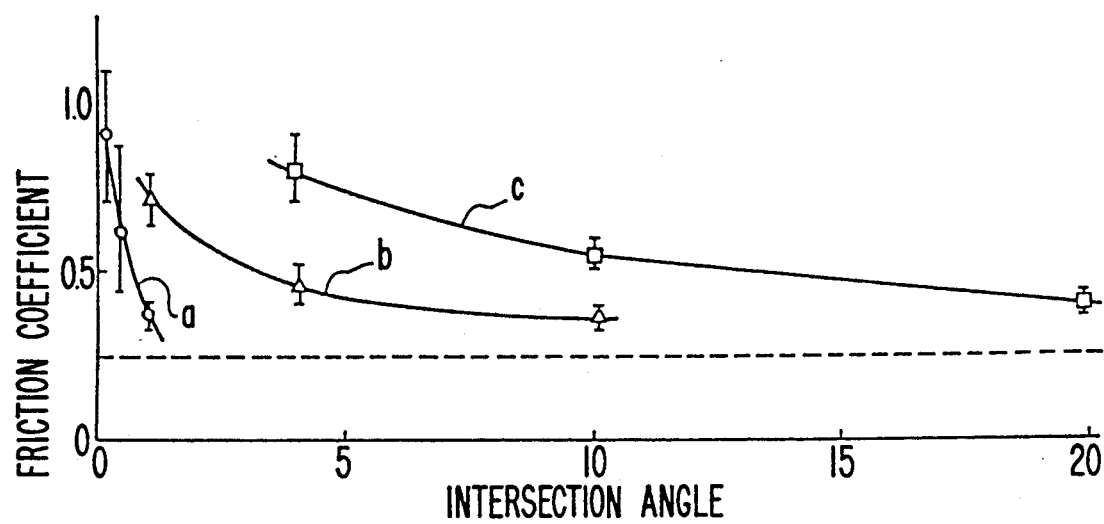
FIG. 4 is a graph showing the relation of the friction coefficient to the intersection angle.
Figure 5A:
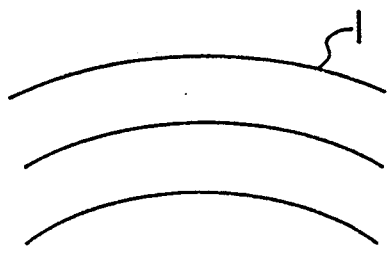
FIGS. 5 (a) and (b) are enlarged plan views of main portions of different textures created in different patterns.
Figure 5B:
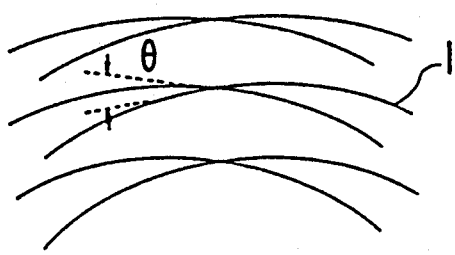

The texture-machining by the means shown in FIG. 1 was used. The speed of the texture tape 3 moving diametrically of the substrate 2 was changed to vary the intersection angle to see how the friction coefficient was affected by the intersection angle. FIG. 4 is a graph showing the relation of the friction coefficient to the intersection angle. In this graph, curves a, b, and c show the results of tests made of the CSS characteristics of substrates A, B, and, C, respectively. The tests were performed in the same way as in the above examples. The number of tests carried out was in the neighborhood of 30,000. These substrates A, B, and C were manufactured as follows.

Substrate A: A substrate having an outside diameter of 95 mm, an inside diameter of 25 mm, and a thickness of 1.27 mm was fabricated from aluminum having a high purity of 99.99%. This substrate was electrolized in an acid bath containing chromatic acid, and an underlying layer of alumite was formed on both surfaces of the substrate up to a thickness of 10 μm. The surface was then ground until the layer had a thickness of about 2 μm and was finished to a roughness Ra=40 Å. A texture was created in the surface of the substrate. Then, a magnetic alloy consisting of 24 atomic % of nickel, 5 atomic % of chromium, and cobalt, and then a layer of carbon were sputtered successively on the substrate up to thickenesses of 600 Å and 300 Å, respectively, to form a magnetic film and a protective film of carbon, respectively.

Substrates B and C: Substrates made from the same material and having the same dimensions as the substrate A were prepared. Both surfaces of each substrate were plated with Ni-P up to a thickness of 10 μm to form an underlying layer. The surface was ground until the layer had a thickness of about 2 μm and finished to a roughness Ra=40 Å. A texture was created on this face. Then, a magnetic alloy consisting of 12.5 atomic % of chromium, 3 atomic % of tantalum and cobalt, and then a layer of carbon were successively sputtered on each substrate to form a magnetic film 600 Å thick and a protective film 300 Å thick, respectively.

The CSS characteristics of the substrates A and B were investigated, using an Mn-Zn minimonolithic type magnetic head. With respect to the substrate C, the tests were performed by the use of a composite magnetic head having a slider made from TiCaO3.

It can be seen from FIG. 4 that the friction coefficient decreased with an increasing intersection angle for all curves a, b, and c. Especially for curve a, the friction coefficient decreased greatly at small intersection angles and approached the initial friction coefficient of about 0.25 indicated by the broken line. On the other hand, with respect to curves b and c obtained from the substrates B and C, respectively, the friction coefficient decreased at lower rates with an increasing intersection angle as compared with the case of curve a, but it was possible to make the friction coefficient obtained after the CSS characteristics tests approach the initial friction coefficient. The trend of the curves shown in FIG. 4 may suggest that the friction coefficient obtained after the CSS characteristics tests can be made to approximate the initial friction coefficient as closely as possible. However, making the intersection angle too great complicates the machining process greatly because of the nature of the texture-machining means. Furthermore, the magnetic characteristics which are necessary for the magnetic recording medium, especially the coercive force, are affected. Therefore, it is desired to set the angle within 20°.

INDUSTRIAL APPLICABILITY

Since the novel magnetic recording medium is constructed and has features as described above, the friction coefficient of the surface can be reduced compared with that of the prior art magnetic recording medium by setting the intersection angle of the stripes of the texture to given values. In addition, the characteristics vary little from product to product. Hence, the magnetic recording medium which permits information to be written to or read from it by a magnetic head can have greatly improved reliability and durability.

We claim:

1. A disk-shaped magnetic recording medium comprising:
   a disk-shaped substrate made from a non-magnetic material;
   an underlying film on a film supporting surface of said substrate and made from a non-magnetic material; and
   a magnetic film on a magnetic film supporting surface of said underlying film and made from a magnetic material;
   one of the film supporting surface of said substrate and said magnetic film supporting surface of said underlying film having a texture consisting of stripes extending substantially circumferentially of the substrate, said stripes intersecting the circumferential direction of said substrate at an angle of from 0.1° to 20°, said angle decreasing continuously and linearly from the radially inner part of the disk-shaped substrate toward the radially outer part thereof.

* * * * *